United States Patent [19]

Fujimori

[11] Patent Number: 4,552,863

[45] Date of Patent: Nov. 12, 1985

[54] PROCESS FOR THE PRODUCTION OF ACTIVATED CARBON USING WOOD AS A CARBON SOURCE

[75] Inventor: Eiichi Fujimori, Hiroshima, Japan

[73] Assignee: The Japan Steel Works, Ltd., Tokyo, Japan

[21] Appl. No.: 588,254

[22] Filed: Mar. 12, 1984

[30] Foreign Application Priority Data

Mar. 10, 1983 [JP]   Japan .................................. 58-38356

[51] Int. Cl.[4] ......................... C01B 31/10; B01J 20/20
[52] U.S. Cl. .................................... 502/418; 264/293; 502/420; 502/432
[58] Field of Search ............... 502/417, 418, 428, 429, 502/430, 432, 420; 264/29.1, 29.3, 29.4, 29.6; 423/445, 449, 460, 461; 201/6, 25; 44/1 E, 1 F

[56] References Cited

U.S. PATENT DOCUMENTS

| | | | |
|---|---|---|---|
| 2,008,144 | 7/1935 | Morrell | 502/432 |
| 2,304,351 | 12/1942 | Goss et al. | 502/420 |
| 2,362,463 | 11/1944 | Boehm et al. | 502/432 |
| 4,371,454 | 2/1983 | Hisatsugu et al. | 264/29.3 |

FOREIGN PATENT DOCUMENTS 470494  8/1975  U.S.S.R. ............................. 502/428

*Primary Examiner*—P. E. Konopka
*Attorney, Agent, or Firm*—Sughrue, Mion, Zinn, Macpeak & Seas

[57] ABSTRACT

A process for producing granular activated carbon using wood as a carbon source is described. The process comprises pulverizing wood to produce a wood powder in a fine granular form, drying the wood powder to produce a dry wood powder having a water content of not more than 10% by weight, adding at least one of coal tar and ground pitch to the dry wood powder in an amount of from 5 to 20% by weight based on the total amount of the wood powder and the binder to prepare a raw material, placing the raw material in a pellet mill, extruding the raw material under such temperature and pressure conditions that it is plasticized, and simultaneously cutting it to produce pellets, carbonizing the pellets by heating, and activating the carbonized pellets in a high temperature steam atmosphere. This process makes it possible to efficiently produce activated carbon of high mechanical and adsorption performance.

10 Claims, 1 Drawing Figure

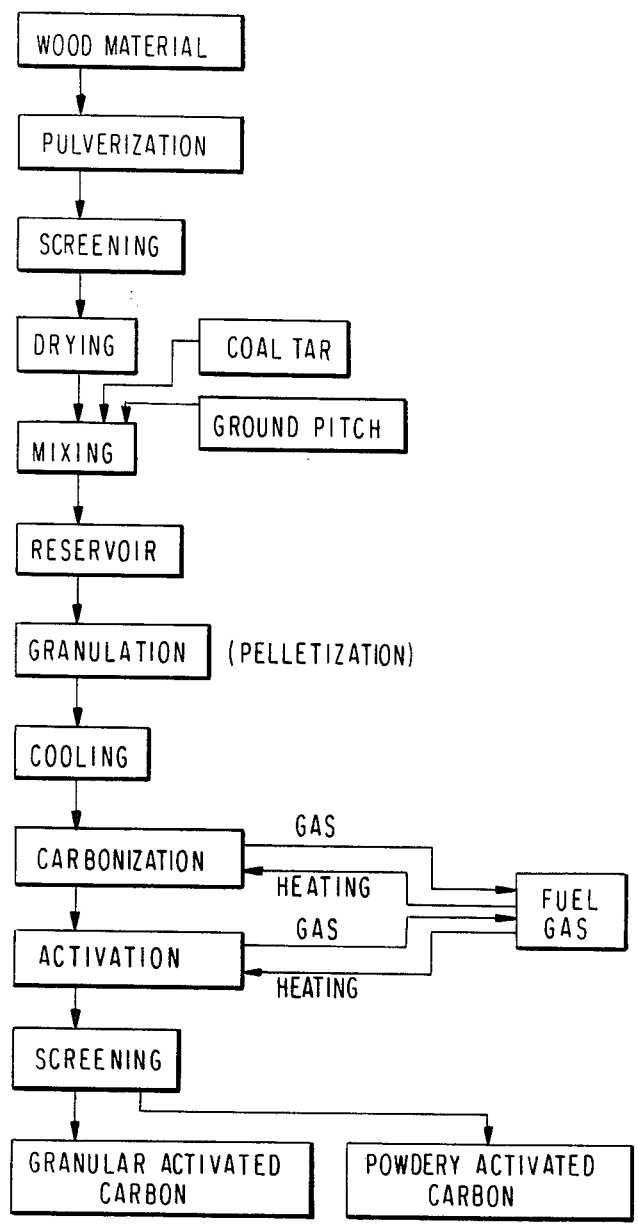

PROCESS FOR THE PRODUCTION OF ACTIVATED CARBON USING WOOD AS A CARBON SOURCE

FIELD OF THE INVENTION

The present invention relates to a process for producing activated carbon in a molded form using wood as a carbon source.

BACKGROUND OF THE INVENTION

Activated carbon in a molded form (hereinafter referred to merely as an "activated carbon" or a "granular activated carbon") is widely used in various fields, for example, in pollution-control equipment for waste gas treatment, waste water treatment and so forth. It is also used in the food industry for the purification of oils and fats and alcohol drinks, and the chemical industry for gas purification and drug purification because of its superior adsorption characteristics resulting from its porous structure and because of its ease of activation.

When used in the above-described fields, activated carbon is usually charged to a column and used in the treatment of various gases or liquids. For this purpose, it is required for activated carbon to have such a high mechanical strength as to be capable of withstanding a continuous use-regeneration cycle and high adsorption characteristics. In producing such activated carbon using wood as a carbon source, the following method has heretofore been employed.

Wood is carbonized by heating and then pulverized. A binder such as coal tar and pitch is added to the carbonized wood in an amount of about 30% by weight. The resulting mixture is then molded, and calcined and activated to produce the final activated carbon product.

This conventional method, however, has various disadvantages as described below.

(1) It is necessary for the binder to be added in an amount of about 30% by weight since carbonized wood powder has great oil-adsorption properties. If, however, such a large amount of binder is added, the raw material becomes plastic at relatively low temperatures and thus high density pellets are difficult to produce by molding. This results in the production of a granular activated carbon having a poor mechanical strength.

(2) If the binder content of the raw material is large, the binder such as coal tar and pitch comes out on the surface during calcination. Thus, pellets formed fuse to each other or are combined together, forming larger masses. In order to prevent the fusion of pellets as described above, it is necessary to apply, for example, a surface oxidation treatment.

(3) The conventional method requires two carbonization steps: carbonization of the wood by heating and carbonization of the mold by calcination. This makes the process complicated, increases the amount of energy consumed, and finally raises the price of activated carbon.

SUMMARY OF THE INVENTION

An object of the invention is to provide a process for the production of a granular activated carbon which is free from the above-described problems.

It has been found that the object is attained by employing a procedure comprising adding a small amount of binder such as coal tar and ground pitch to wood powder, extruding the resulting mixture and simultaneously cutting to form pellets, and then carbonizing and activating the pellets.

The present invention relates to a process for producing a granular activated carbon using wood as a carbon source, which process comprises:

pulverizing wood to produce a wood powder in a fine granular form;

drying the wood powder to produce a dry wood powder having a water content of not more than 10% by weight;

adding at least one of coal tar and ground pitch to the dry wood powder as a binder in an amount of from 5 to 20% by weight based on the total amount of the wood powder and the binder to prepare a raw material;

placing the raw material in a pellet mill;

extruding the raw material under such temperature and pressure conditions that it is plasticized, and simultaneously cutting it to produce pellets;

carbonizing the pellets by heating; and activating the carbonized pellets in a high temperature steam atmosphere to produce a granular activated carbon.

BRIEF DESCRIPTION OF THE DRAWING

The FIGURE is a diagram showing the steps of the process of the invention.

DETAILED DESCRIPTION OF THE INVENTION

The present invention will hereinafter be explained with reference to the accompanying drawing.

As a wood material, any kind of wood material can be used, but a waste wood and a sawdust are economically preferred. When a needle-leaf tree such as a pine or a fir is used as a wood material, a high quality products can be obtained.

The wood material is pulverized to produce a wood powder. As an apparatus for pulverizing the wood material, a hammer-mill can be used. When a sawdust having a particle size of less than about 1 mm is used, the pulverizing step can be omitted.

The thus prepared wood powder is screened by passing it through a screen (width of opening: about 4 to 6 mm) whereby relatively large wood pieces are removed. A preferred average particle size of wood powder is about 1 mm or less and more preferably about 0.22 mm or less.

The wood powder is dried in a drying machine. The water content of the dried wood powder is sufficient to be not more than 10% by weight and is most preferably between 4 and 5% by weight. If the water content is in excess of 10% by weight, pellets as prepared hereinafter do not have sufficient strength. The wood powder may be dried to the extent that the water content reaches nearly 0. In this case, care must be taken so that the wood powder does not catch fire.

Coal tar and/or ground pitch is added to the above-dried wood powder as a binder within a range of from 5 to 20% by weight based on the total amount of the wood powder and the binder and fully mixed in a continuous mixing apparatus. If the amount of the binder being added is less than 5% by weight, plug flow in the die hole does not occur in extruding by means of a pellet mill as described hereinafter and thus molding becomes impossible. On the other hand, if the amount of the binder added is in excess of 20% by weight, the raw material is plasticized even under low pressures. Hence, the pressure in the die hole of the pellet mill cannot be increased to a predetermined level, and there can be produced only pellets of low stiffness.

Any kind of coal tar and ground pitch can be used in the present invention. A preferred coal tar is that being a viscous fluid state at room temperature, and a preferred ground pitch is that being a solid state at room temperature and having a particle size of less than 1 mm.

Since the ground pitch contains much more fixed carbon and much less volatile carbon as compared with the coal tar, it is preferred to use the ground pitch rather than the coal tar for the purpose of increasing the mechanical strength of the granular activated carbon. However, since the presence of the coal tar contributes to prevent the die hole from clogging with the raw material, it is preferred to use a little amount of the coal tar in combination with the ground pitch. When the coal tar is used in combination with the ground pitch, the ratio by weight of the coal tar to the ground pitch is 2~5:7, preferably 3:7.

The thus-prepared raw material is sent to a reservoir where it is stored.

A predetermined amount of raw material is fed to the pellet mill. A pellet mill which can be used in the present invention preferably comprises a cylindrical die which is driven in a rotational motion by means of a motor, a plurality of rolls disposed in contact with the inner surface of the die, and a spreader adapted to uniformly dispense the raw material in the spaces between the inner surface and rolls. The die has a plurality of die holes formed in the direction of the radius, which extend from the inner surface of the die to the outer circumference thereof. The diameter of the die hole is preferably between 5 and 7 mm.

As examples of the pellet mill which can be used in the present invention, there are disclosed in U.S. Pat. Nos. 3,129,458, 3,191,227, 3,538,456, 3,559,238, 3,679,343, 3,743,462, and 3,826,475.

The raw material introduced in the die in a predetermined amount is caught between the inner surface of the die and the outer surface of the roll and compressed therein. The raw material is plasticized by the heat generated by the foregoing compression and also by internal friction of the raw material at the time of compression and is continuously extruded through the die holes. In the die hole, the raw material forms a plug flow (i.e., a flow of solid material through a pipe). In this zone, the temperature reaches 100° to 170° C. and the pressure 1,000 to 6,000 kg/cm$^2$. Under these conditions, the coal tar and the pitch in the raw material permeate uniformly into the interior of the structure of the wood powder. Thus, the wood powder is given great tackiness by the action of the coal tar or the pitch and ingredients, such as oils and lignin, contained in the wood powder, and its density is also increased.

The rod-shaped mold extruded from the die hole is cut to a length ranging preferably between 10 and 15 mm by means of a cutter knife provided adjacent to the die.

The shape and the size of the pellet can be controlled by adjusting the diameter of the die holes and the space between the cutter knife and the outer surface of the die.

The thus-produced pellets are sent to a carbonization step. Prior to this carbonization, the pellets are cooled by forced air-blowing. This cooling greatly increases the mechanical strength of pellets.

For this carbonization, the pellets are heated at a temperature of from 500° to 600° C. for about 30 minutes in a oxygen-free or almost oxygen-free furnace. It is most preferred for the temperature to be about 550° C. This heating carbonizes the pellets and reduces their volumes to from 40 to 50% the original ones. Even if the temperature is raised at a rate as high as 10° C./min or more, the fusion of the pellets to each other and the swelling phenomenon of the pellets do not occur. The weight of the carbonized pellets is 30 to 40% the original one prior to the carbonization process. This is due to the loss of water and volatiles in the pellets and the thermal decomposition of carbohydrates in the pellets. In this way, the pellets are provided with a porous structure.

The carbonized pellets are sent to the activation step, where the pellets are heated at a temperature of 850° C. (the temperature may be within the range of from 850° to 900° C.) in an oxygen-free condition in a rotary kiln and steam is blown therethrough. It is suitable that the activation time be between 1.5 and 2.0 hours, and the amount of steam being blown into the kiln be between 1.2 and 2.0 kg per kilogram of the pellets. This activation further develops the porous structure of the pellets and produces activated carbon of high porosity.

The activated carbon thus-produced is cooled in an inert atmosphere and thereafter screened to remove powdered activated carbon or powdery activated carbon. This powder is used as powdery activated carbon. At the above-described carbonization and activation steps, the pellets release combustible gases. Thus, these gases are recovered and used as the fuel gas for the carbonization and activation steps.

Activated carbon produced by the process of the invention was tested according to the activated carbon testing method (JIS K1474 and K1470). The results are shown below.

|  |  |
| --- | --- |
| (1) Methylene blue decoloring power (ml/g) | 210–250 |
| (2) Iodine adsorption power (mg/g) | 1,120–1,200 |
| (3) Surface area (m$^2$/g) | 880–1,100 |
| (4) Hardness (%) | 94.0–97.3 |

In accordance with the process of the invention, since a relatively small amount of at least one of coal tar and pitch is added to a wood powder and the resulting mixture is pelletized under conditions of high temperature and high pressure, high quality activated carbon of sufficiently high mechanical strength and density can be produced. The carbonization process is needed only once after the pelletization process. Furthermore, since the porous structure of the wood powder is not broken during the proceeding processes, activated carbon of high adsorption performance can be produced by applying activation using a small amount of water and only in a short period of time.

The process of the invention comprises: pulverizing wood to produce a wood powder in a fine granular form; drying the wood powder to produce a dry wood powder having a water content of not more than 10% by weight; adding at least one of coal tar and ground pitch to the dry wood powder as a binder in an amount of from 5 to 20% by weight based on the total amount of the wood powder and the binder to prepare a raw material; placing the raw material in a pellet mill; extruding the raw material under such temperature and pressure conditions that it is plasticized, and simultaneously cutting it to produce pellets; carbonizing the pellets by heating; and activating the carbonized pellets in a high temperature steam atmosphere to produce a granular activated carbon. Thus, the present invention brings about the effect that the granular activated carbon of high mechanical and adsorption performance can be produced efficiently.

While the invention has been described in detail and with reference to specific embodiments thereof, it will be apparent to one skilled in the art that various changes and modifications can be made therein without departing from the spirit and scope thereof.

What is claimed is:

1. A process for producing a granular activated carbon using wood as a carbon source, comprising the steps of:
    pulverizing wood to produce a wood powder in a fine granular form;
    drying the wood powder to produce a dry wood powder having a water content of not more than 10% by weight;
    adding a binder mixture of coal tar which is in a viscous fluid state at room temperature and ground pitch which is in a solid state at room temperature in a ratio of coal tar to ground pitch of 2 to 5:7 by weight to the dry wood powder in an amount of from 5 to 20% by weight based on the total amount of the wood powder and the binder to prepare a raw material;
    placing the raw material in a pellet mill;
    extruding the raw material through a die hole at a temperature of 100° to 170° C. and pressure of 1,000 to 6,000 kg/cm² so that it is plasticized and forms a plug flow in the die hole, and simultaneously cutting it to produce pellets;
    carbonizing the pellets by heating under conditions so that the pellets do not fuse to each other and do not swell;
    activating the carbonized pellets in a high temperature steam atmosphere.

2. A process as claimed in claim 1, wherein the wood powder is comprised of particles having a size of about 1 mm or less.

3. A process as claimed in claim 1, wherein the dry wood powder has a water content in the range of 4% to 5% by weight.

4. A process as claimed in claim 1, wherein the raw material is extruded through a die hole having a diameter in the range of 5 mm to 7 mm and the extruded material is cut to lengths in the range of 10 mm to 15 mm.

5. A process as claimed in claim 1, wherein the carbonizing of the pellets is carried out at a temperature in the range of 500° C. to 600° C.

6. A process as claimed in claim 5, wherein the carbonizing is carried out for a period of time of about 30 minutes.

7. A process as claimed in claim 6, wherein the carbonizing is carried out in a substantially oxygen free atmosphere.

8. A process as claimed in claim 7, wherein the carbonizing is carried out at a temperature of about 550° C.

9. A process as claimed in claim 1, wherein the activating is carried out at a temperature in the range of 850° C. to 900° C. for a period of time of between 1.5 and 2 hours while utilizing steam in an amount of between 1.2 and 2.0 kg per kilogram of pellet.

10. A process as claimed in claim 1 wherein the raw material is extruded through a die hole having a diameter in the range of 5 mm to 7 mm and the extruded material is cut to lengths in the range of 10 mm to 15 mm, and by said carbonizing the volume and weight of the extruded pellets are reduced to 40 to 50% of original volume and to 30 to 40% of original weight.

* * * * *